US009592708B2

(12) United States Patent
Knapke et al.

(10) Patent No.: US 9,592,708 B2
(45) Date of Patent: Mar. 14, 2017

(54) TIRE INFLATION SYSTEM

(71) Applicant: Dana Heavy Vehicle Systems Group, LLC, Maumee, OH (US)

(72) Inventors: Brian V. Knapke, Toledo, OH (US); Lloyd G. Racine, Lamoure, ND (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 15/236,128

(22) Filed: Aug. 12, 2016

(65) Prior Publication Data
US 2016/0347132 A1 Dec. 1, 2016

Related U.S. Application Data

(63) Continuation of application No. 13/261,968, filed as application No. PCT/US2013/035588 on Apr. 8, 2013, now Pat. No. 9,446,637.

(60) Provisional application No. 61/790,349, filed on Mar. 15, 2013, provisional application No. 61/653,482, (Continued)

(51) Int. Cl.
*B60C 23/00* (2006.01)
*B60C 23/10* (2006.01)

(52) U.S. Cl.
CPC ............ *B60C 23/003* (2013.01); *B60C 23/10* (2013.01)

(58) Field of Classification Search
CPC ....... B60C 23/003; B60C 23/10; B60C 23/12; B60C 23/14; B60C 23/001
See application file for complete search history.

(56) References Cited

U.S. PATENT DOCUMENTS

| 1,776,140 A | 9/1930 | Balfe |
| 1,788,041 A | 1/1931 | Balfe |
| 1,911,484 A | 5/1933 | Victor |

(Continued)

FOREIGN PATENT DOCUMENTS

| CN | 102069680 A | 5/2011 |
| DE | 102012101801 A1 | 8/2013 |

(Continued)

OTHER PUBLICATIONS

International Search Report and Written Opinion for International Patent Application No. PCT/US2013/035588, mailing late Sep. 6, 2013, issued by the European Patent Office.

*Primary Examiner* — Erez Gurari
(74) *Attorney, Agent, or Firm* — Marshall & Melhorn, LLC

(57) ABSTRACT

A tire inflation system including an axle housing and a sealing ring disposed on the axle housing. The sealing ring has a conduit formed therethrough. A hub is rotatably disposed on the axle housing. The hub is disposed adjacent the sealing ring and has a conduit formed therethrough which is in fluid communication with a conduit formed through a fastener engaged with the hub. The tire inflation system also includes an inner rotary seal disposed between the sealing ring and the hub and an outer rotary seal disposed between the sealing ring and the hub. The conduit formed through the hub is in fluid communication with the conduit formed through the sealing ring through an area between the inner rotary seal and the outer rotary seal. A bearing seal is disposed between the hub and the axle housing and outboard of the outer rotary seal.

20 Claims, 8 Drawing Sheets

Related U.S. Application Data filed on May 31, 2012, provisional application No. 61/621,601, filed on Apr. 9, 2012.

(56) References Cited

U.S. PATENT DOCUMENTS

| | | | |
|---|---|---|---|
| 2,026,854 | A | 1/1936 | Victor |
| 2,055,471 | A | 9/1936 | Balfe |
| 3,519,281 | A | 7/1970 | Teucher et al. |
| 4,387,931 | A | 6/1983 | Bland |
| 4,434,833 | A | 3/1984 | Swanson et al. |
| 4,470,506 | A | 9/1984 | Goodell et al. |
| 4,532,493 | A | 7/1985 | Sibeud |
| 4,705,090 | A | 11/1987 | Bartos |
| 4,730,656 | A | 3/1988 | Goodell et al. |
| 4,733,707 | A | 3/1988 | Goodell et al. |
| 4,804,027 | A * | 2/1989 | Runels ............... B60C 23/003 137/580 |
| 4,883,106 | A * | 11/1989 | Schultz .............. B60B 7/002 152/415 |
| 4,892,128 | A * | 1/1990 | Bartos ............... B60C 23/003 137/580 |
| 4,893,664 | A | 1/1990 | Oltean |
| 4,895,199 | A * | 1/1990 | Magnuson .......... B60C 23/003 137/102 |
| 4,911,972 | A | 3/1990 | Mercuri |
| 4,922,946 | A * | 5/1990 | Boulicault ......... B60C 23/003 137/102 |
| 4,987,937 | A | 1/1991 | Nowicke |
| 5,080,156 | A | 1/1992 | Bartos |
| 5,174,839 | A * | 12/1992 | Schultz .............. B60C 23/003 152/415 |
| 5,203,391 | A | 4/1993 | Fox |
| 5,221,381 | A | 6/1993 | Hurrell, II |
| 5,398,743 | A | 3/1995 | Bartos |
| 5,421,594 | A | 6/1995 | Becerra |
| 5,505,080 | A | 4/1996 | McGhee |
| 5,531,110 | A | 7/1996 | Ohashi et al. |
| 5,531,454 | A | 7/1996 | Borneby |
| 5,541,859 | A | 7/1996 | Inoue et al. |
| 5,769,979 | A | 6/1998 | Naedler |
| 5,772,215 | A | 6/1998 | West |
| 5,868,881 | A | 2/1999 | Bradley |
| RE36,206 | E | 5/1999 | Borneby |
| 5,913,241 | A | 6/1999 | Ohashi et al. |
| 5,970,612 | A | 10/1999 | West |
| 5,979,526 | A | 11/1999 | Chamoy |
| 6,145,558 | A | 11/2000 | Schmitz |
| 6,145,559 | A | 11/2000 | Ingram, II |
| 6,182,727 | B1 | 2/2001 | Beesley |
| 6,199,611 | B1 | 3/2001 | Wernick |
| 6,244,316 | B1 * | 6/2001 | Naedler ............. B60C 23/003 152/417 |
| 6,254,196 | B1 * | 7/2001 | Gee ................... B60B 27/00 301/105.1 |
| 6,260,595 | B1 | 7/2001 | Cobb |
| 6,283,186 | B1 | 9/2001 | Krisher |
| 6,325,123 | B1 * | 12/2001 | Gao ................... B60C 23/003 152/416 |
| 6,363,985 | B1 | 4/2002 | Beesley |
| 6,394,159 | B1 | 5/2002 | Cobb |
| 6,425,427 | B1 | 7/2002 | Stech |
| 6,427,739 | B1 * | 8/2002 | Medsker ............. B60C 23/003 152/415 |
| 6,474,383 | B1 | 11/2002 | Howald et al. |
| 6,492,805 | B1 | 12/2002 | Wakabayashi et al. |
| 6,497,262 | B1 | 12/2002 | Skoff et al. |
| 6,575,269 | B1 | 6/2003 | Skoff et al. |
| 6,591,670 | B1 | 7/2003 | Umeno et al. |
| 6,668,888 | B1 | 12/2003 | Beesley et al. |
| 6,685,197 | B1 | 2/2004 | Rakauskas |
| 6,698,482 | B2 | 3/2004 | Hennig et al. |
| 6,845,987 | B2 | 1/2005 | McCutchan |
| 6,871,683 | B2 | 3/2005 | Cobb |
| 6,880,598 | B2 | 4/2005 | Haunhorst et al. |
| 6,894,607 | B1 | 5/2005 | Claussen et al. |
| 6,938,658 | B2 | 9/2005 | Jarrett et al. |
| 6,962,349 | B2 | 11/2005 | Notter et al. |
| 6,976,789 | B2 | 12/2005 | Pilone |
| 7,117,909 | B2 | 10/2006 | Jarrett et al. |
| 7,159,873 | B2 | 1/2007 | McCutchan |
| 7,168,468 | B2 | 1/2007 | Wang et al. |
| 7,207,365 | B2 | 4/2007 | Nelson et al. |
| 7,255,481 | B2 | 8/2007 | Mermoud |
| 7,302,979 | B2 | 12/2007 | Davison et al. |
| 7,306,020 | B2 | 12/2007 | Beverly et al. |
| 7,316,159 | B2 | 1/2008 | Fujioka et al. |
| 7,454,966 | B2 | 11/2008 | Fujioka et al. |
| 7,488,046 | B2 | 2/2009 | Vignotto et al. |
| 7,686,051 | B2 | 3/2010 | Medley et al. |
| 7,690,412 | B1 * | 4/2010 | Jenkinson ........... B60C 23/003 152/416 |
| 7,896,045 | B2 | 3/2011 | Solie et al. |
| 7,898,487 | B2 | 3/2011 | Pradier et al. |
| 7,931,061 | B2 | 4/2011 | Gonska et al. |
| 7,989,049 | B2 | 8/2011 | Potier |
| 7,992,610 | B2 | 8/2011 | Collet et al. |
| 8,042,585 | B2 | 10/2011 | Isono |
| 8,052,400 | B2 * | 11/2011 | Isono ................. B60C 23/003 152/417 |
| 8,057,103 | B2 | 11/2011 | Fischer et al. |
| 8,069,890 | B2 | 12/2011 | Resare et al. |
| 8,087,439 | B2 | 1/2012 | Hobe et al. |
| 8,122,926 | B2 | 2/2012 | Rogers |
| 8,145,853 | B2 | 3/2012 | Kajigaya |
| 8,191,594 | B2 | 6/2012 | Saadat |
| 8,307,869 | B2 | 11/2012 | Medley et al. |
| 8,336,889 | B2 | 12/2012 | Unseld et al. |
| 8,453,692 | B2 | 6/2013 | Saadat |
| 8,479,790 | B2 | 7/2013 | Resare et al. |
| 8,505,600 | B2 | 8/2013 | Padua et al. |
| 8,590,585 | B2 | 11/2013 | Rogers |
| 8,616,254 | B2 | 12/2013 | Kelley et al. |
| 8,783,314 | B2 | 7/2014 | Tigges |
| 8,915,274 | B2 * | 12/2014 | Eschenburg ........ B60C 23/003 152/416 |
| 9,126,460 | B2 * | 9/2015 | Knapke .............. B60C 23/003 |
| 9,162,539 | B2 | 10/2015 | Hibbler et al. |
| 9,315,077 | B2 * | 4/2016 | Flory ................. B60C 23/003 |
| 9,446,637 | B2 * | 9/2016 | Knapke .............. B60C 23/003 |
| 2007/0198150 | A1 | 8/2007 | Kato et al. |
| 2009/0084481 | A1 | 4/2009 | Kalavitz |
| 2009/0211682 | A1 | 8/2009 | Sobotzik |
| 2010/0109255 | A1 | 5/2010 | Waldvogel et al. |
| 2010/0176558 | A1 | 7/2010 | Egloff et al. |
| 2011/0221261 | A1 | 9/2011 | Eaton et al. |
| 2012/0024445 | A1 | 2/2012 | Wilson et al. |
| 2013/0284281 | A1 | 10/2013 | Brenninger et al. |
| 2015/0101722 | A1 | 4/2015 | Lakin et al. |
| 2015/0107742 | A1 | 4/2015 | Knapke et al. |
| 2015/0273958 | A1 | 10/2015 | Stoychev et al. |
| 2016/0009148 | A1 * | 1/2016 | Berkness ........... B60C 23/003 152/417 |
| 2016/0152100 | A1 * | 6/2016 | Berkness ........... B60C 23/003 301/6.5 |
| 2016/0318359 | A1 * | 11/2016 | Knapke .............. B60C 23/003 |

FOREIGN PATENT DOCUMENTS

| | | |
|---|---|---|
| EP | 0265296 A1 | 4/1988 |
| EP | 0588595 A1 | 3/1994 |
| EP | 1088751 A2 | 4/2001 |
| FR | 2895470 A1 | 6/2007 |
| GB | 883267 A | 11/1961 |
| GB | 2223207 A | 4/1990 |
| GB | 2477816 A | 8/2011 |
| JP | 2002087029 A | 3/2002 |
| JP | 2003294560 A | 10/2003 |
| JP | 2006088809 A | 4/2006 |
| JP | 2007131151 A | 5/2007 |
| JP | 2007230295 A | 9/2007 |
| KR | 20050116845 A | 12/2005 |
| KR | 20120068191 A | 6/2012 |

(56) References Cited

FOREIGN PATENT DOCUMENTS

| WO | 2012031880 A1 | 3/2012 |
| WO | 2012045533 A1 | 4/2012 |
| WO | 2012084690 A1 | 6/2012 |

* cited by examiner

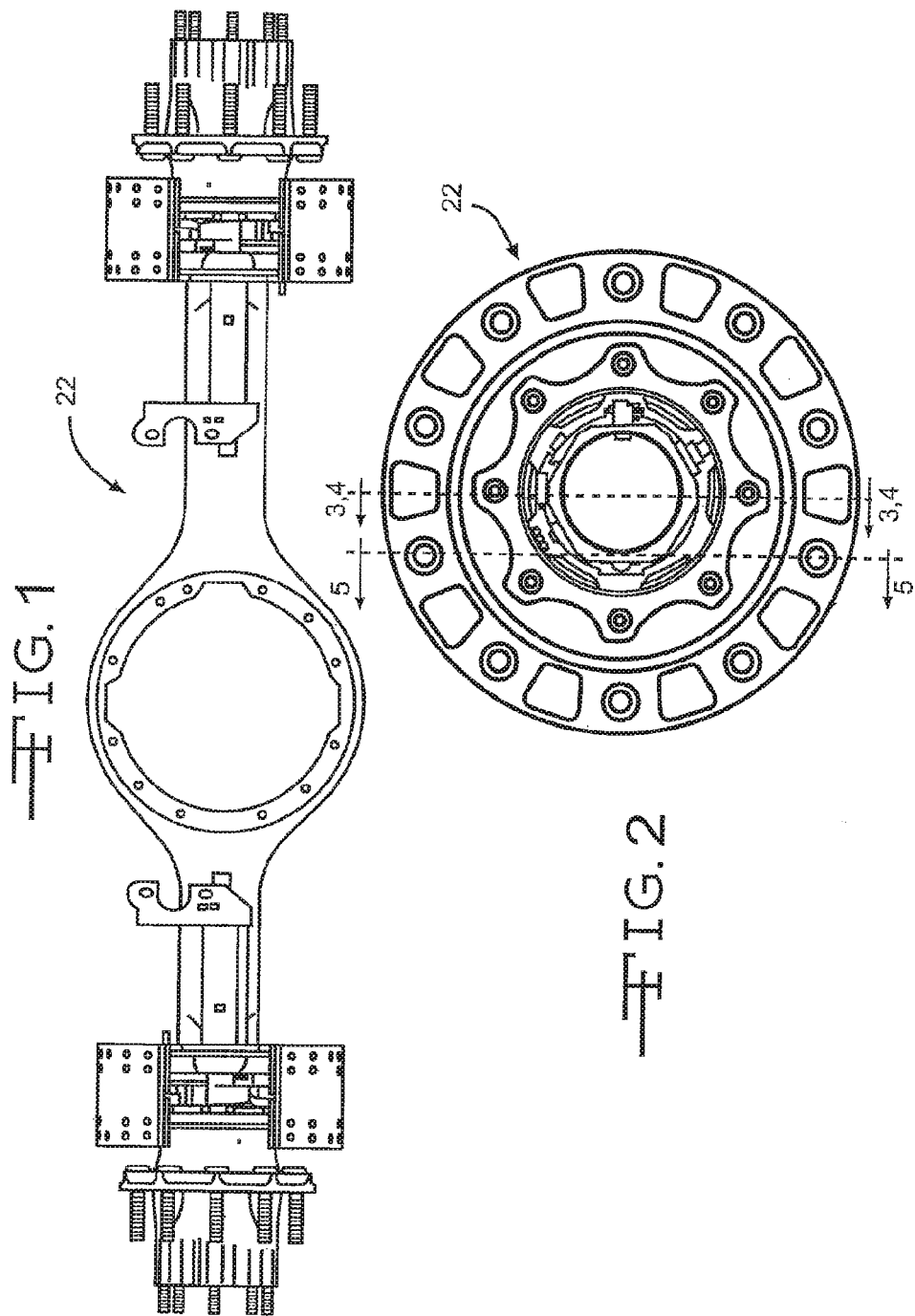

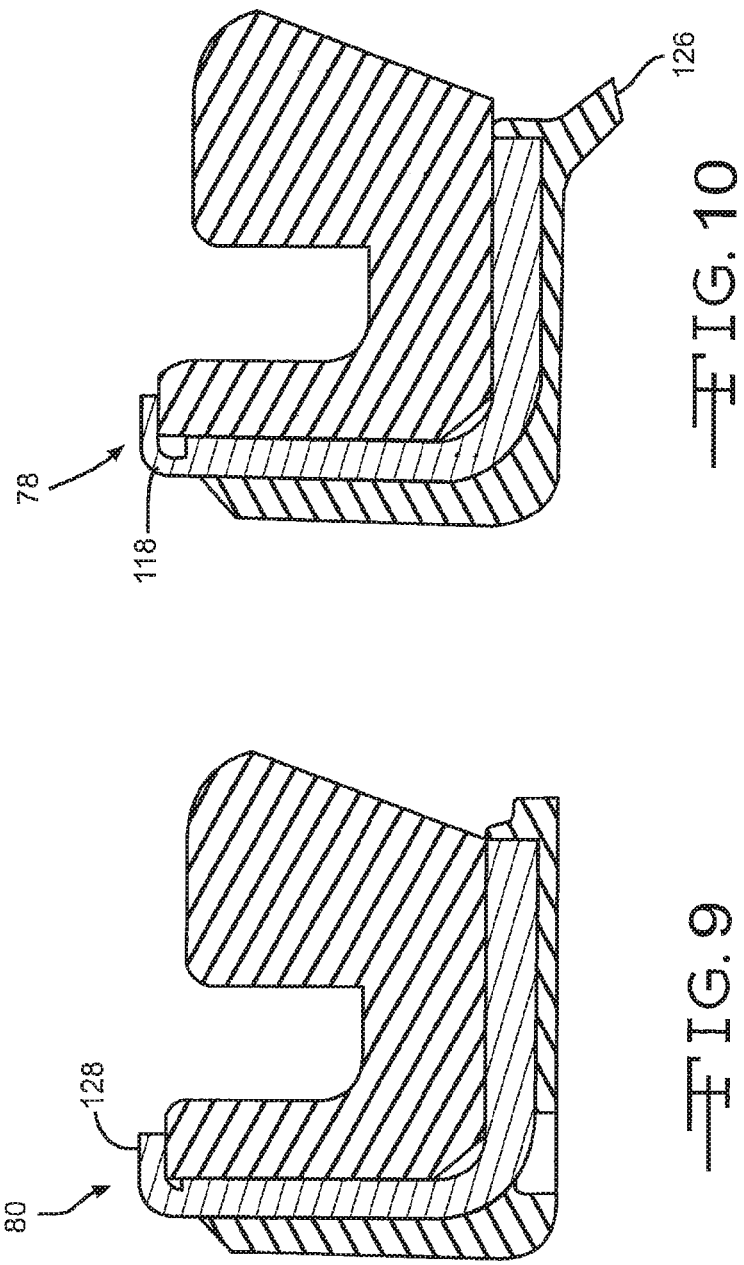

TIRE INFLATION SYSTEM

CROSS-REFERENCE TO RELATED APPLICATIONS

This application is a continuation of the non-provisional application granted Ser. No. 13/261,968 filed on Oct. 8, 2014, the entire disclosure of which is hereby incorporated by reference, which is a national stage application of the international application granted Serial No. PCT/US2013/035588 filed on Apr. 8, 2013, which claims the benefit of the provisional applications granted Ser. Nos. 61/621,601 filed on Apr. 9, 2012, 61/653,482 filed on May 31, 2012 and 61/790,349 filed on Mar. 15, 2013, the entire disclosures of which are hereby incorporated by reference.

BACKGROUND OF THE INVENTION

The invention relates to a tire inflation system for a vehicle. More particularly, the invention relates to a tire inflation system which utilizes a conduit formed through a hub to communicate a pressurized fluid, such as air, to one or more tires provided on a drive axle of the vehicle.

Tire inflation systems for vehicles are used to provide a vehicle with the versatility to maneuver over differing terrain types and to reduce maintenance requirements. For example, a plurality of tires in fluid communication with a tire inflation system may be at a pressure which can be lowered to provide additional traction for the vehicle or raised to reduce the rolling resistance and increase the fuel efficiency of the vehicle. Additionally, utilizing a tire inflation system may eliminate the need to periodically check and adjust the pressure within each tire. However, tire inflation systems are difficult to install on a drive axle due to the increased complexities associated therewith, spacing requirements, and associated costs.

Thus, it would be desirable to provide a tire inflation system that includes one or more of the aforementioned advantages and overcomes the aforementioned difficulties.

BRIEF SUMMARY OF THE INVENTION

A tire inflation system is provided.

In an embodiment, the tire inflation system comprises an axle housing and a sealing ring. The sealing ring is disposed on the axle housing and has a conduit formed therethrough. A hub is rotatably disposed on the axle housing. The hub is disposed adjacent the sealing ring and has a conduit formed therethrough which is in fluid communication with a conduit formed through a fastener engaged with the hub. An inner rotary seal disposed between the sealing ring and the hub. An outer rotary seal is disposed between the sealing ring and the hub. The conduit formed through the hub is in fluid communication with the conduit formed through the sealing ring through an area between the inner rotary seal and the outer rotary seal. A bearing seal is disposed between the hub and the axle housing and outboard of the outer rotary seal.

In another embodiment, the tire inflation system comprises an axle housing and a sealing ring. The sealing ring is disposed on the axle housing and has a conduit formed therethrough. A hub is rotatably disposed on the axle housing. The hub is disposed adjacent the sealing ring and has a conduit formed therethrough which is in fluid communication with a conduit formed through a fastener engaged with the hub. An inner rotary seal is disposed between the sealing ring and the hub. An outer rotary seal is disposed between the sealing ring and the hub. The conduit formed through the hub is in fluid communication with the conduit formed through the sealing ring through an area between the inner rotary seal and the outer rotary seal. A bearing seal is disposed between the hub and the axle housing and outboard of the outer rotary seal. A vent is formed in the hub. The vent is in fluid communication with a space provided between the bearing seal and the outer rotary seal.

BRIEF DESCRIPTION OF THE SEVERAL VIEWS OF THE DRAWINGS

The above, as well as other advantages of the process will become readily apparent to those skilled in the art from the following detailed description when considered in the light of the accompanying drawings in which:

FIG. 1 depicts a front view of a drive axle assembly which has a tire inflation system in accordance with the invention;

FIG. 2 depicts an end view of the drive axle assembly of FIG. 1;

FIG. 9 depicts a cross-sectional view of a portion of an embodiment of an outer rotary seal for use in the various embodiments of the tire inflation system;

FIG. 10 depicts a cross-sectional view of a portion of an embodiment of an inner rotary seal for use in the various embodiments of the tire inflation system;

DETAILED DESCRIPTION OF THE INVENTION

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Embodiments of a tire inflation system 20 are described herein. The tire inflation system will be described in connection for use with a vehicle (not depicted). It would be understood by one of ordinary skill in the art that the various embodiments of the tire inflation system described herein may have applications to commercial and off-highway vehicles. Furthermore, it would be understood by one of ordinary skill in the art that these embodiments could have industrial, locomotive, military and aerospace applications.

Embodiments of the tire inflation system 20, which hereinafter may also be referred to as the "system", are preferably used with a drive axle assembly 22 for the vehicle. An embodiment of the drive axle assembly 22 suitable for use with the tire inflation system 20 is best shown in FIGS. 1 and 2. However, it should be appreciated that the tire inflation system may be used apart from a drive axle assembly. For example, in certain embodiments (not depicted), the tire inflation system may be used with a steer axle assembly.

Figure 3:
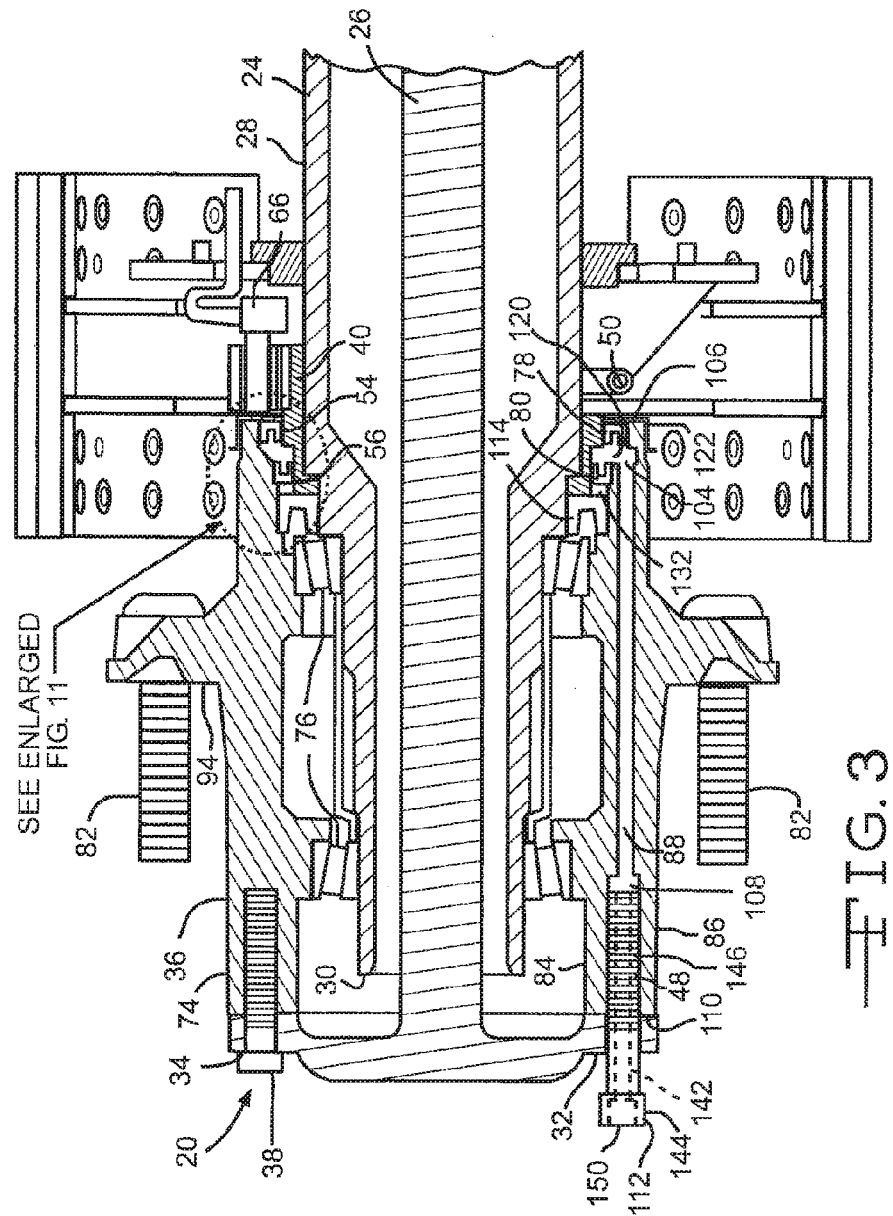
FIG. 3 depicts a cross-sectional view of a portion of the drive axle of FIG. 1 along line 3-3 and illustrates an embodiment of the tire inflation system in accordance with the invention.
Figure 4:
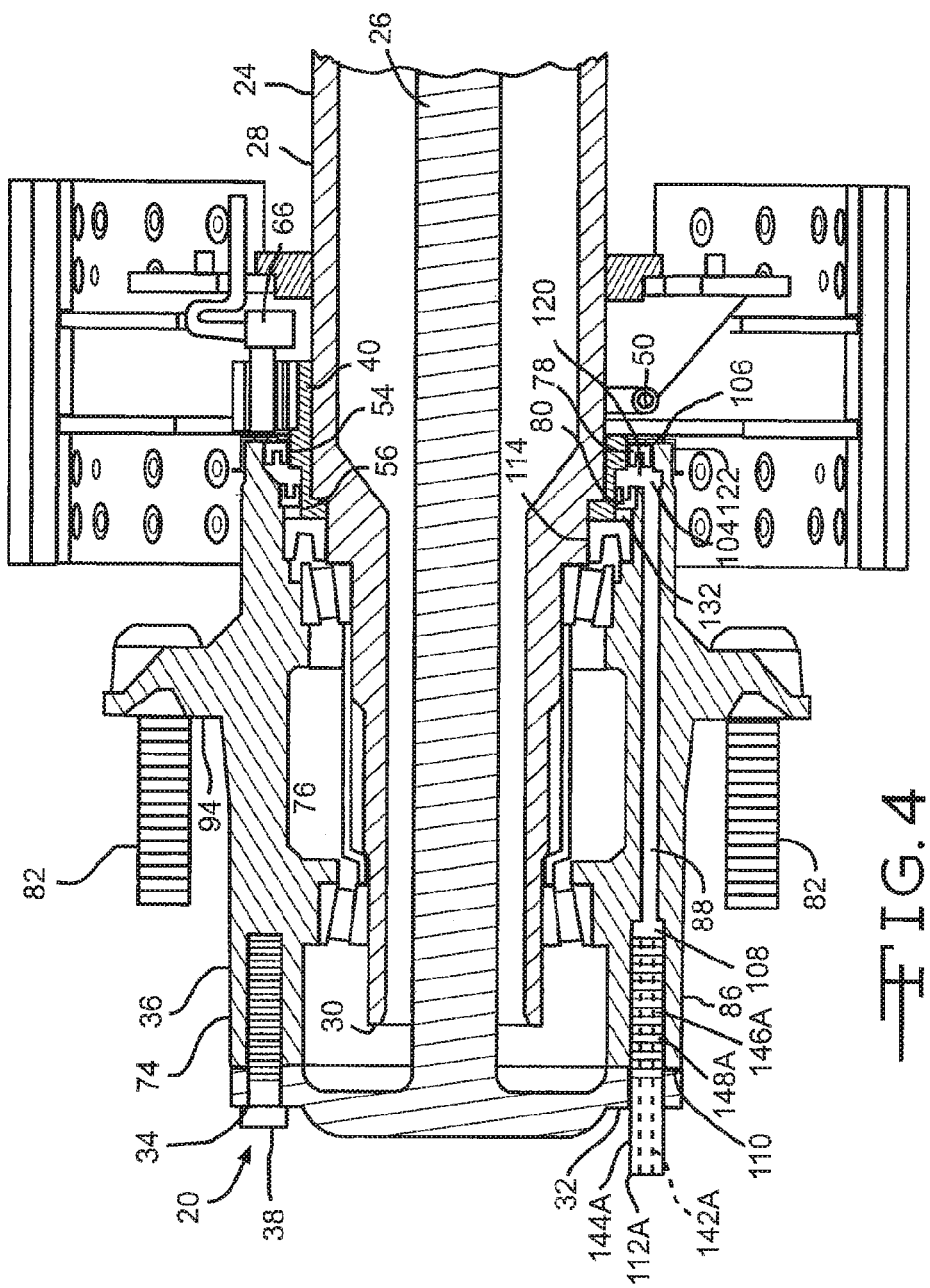
FIG. 4 depicts a cross-sectional view of a portion of the drive axle of FIG. 1 along line 4-4 and illustrates another embodiment of the tire inflation system in accordance with the invention.
Figure 5:
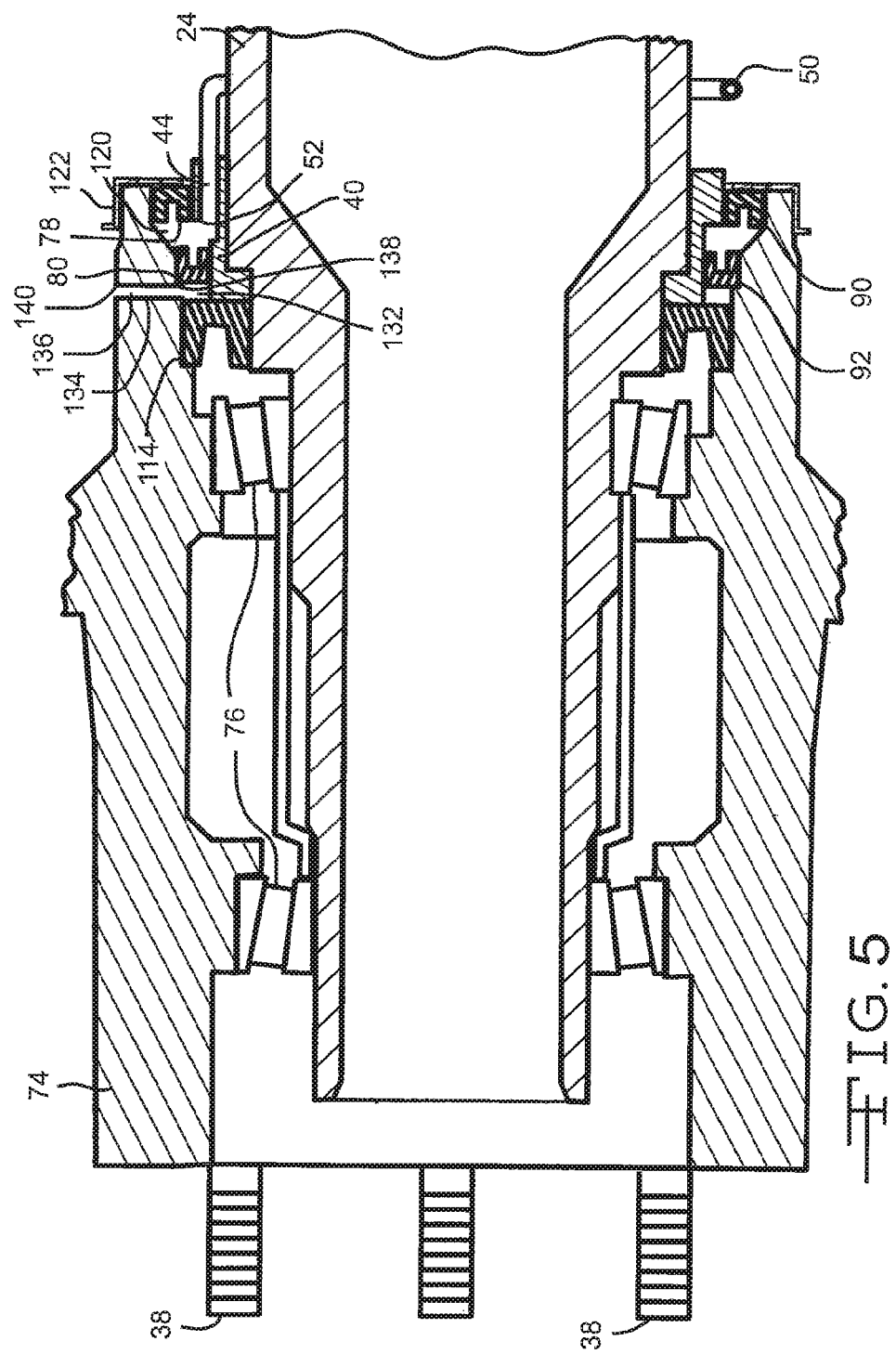
FIG. 5 depicts a cross-sectional view of a portion of the drive axle of FIG. 1 along line 5-5 with portions of the hub removed for the ease of depiction and illustrates a further embodiment of the tire inflation system in accordance with the invention.

As illustrated in best in FIGS. 3-5, the tire inflation system 20 comprises an axle housing 24. The axle housing 24 may be formed unitarily or may comprise a plurality of components coupled together. The axle housing 24 is a hollow member into which an axle 26 is rotatably disposed through. In an embodiment, the axle housing 24 comprises an outer surface 28 which is of a stepped cylindrical shape and may reduce in diameter towards an end 30.

The axle 26 is rotatably disposed in the axle housing 24 and is preferably a drive axle. The axle 26 includes a flanged end 32. The flanged end 32 has a plurality of perforations 34 formed therethrough for coupling the axle 26 to a hub assembly 36. Preferably, the axle 26 is coupled to the hub assembly 36 with a plurality of threaded fasteners 38. However, it should be understood that the axle 26 may be coupled to the hub assembly 36 in any other conventional manner.

The tire inflation system 20 comprises a sealing ring 40. The sealing ring 40 and the hub assembly 36 are fitted to the axle housing 24. The sealing ring 40 and the hub assembly 36 are disposed about the outer surface 28 of the axle housing 24. Preferably, the sealing ring 40 is non-rotatably disposed on the outer surface 28 of the axle housing 24.

Figure 8:
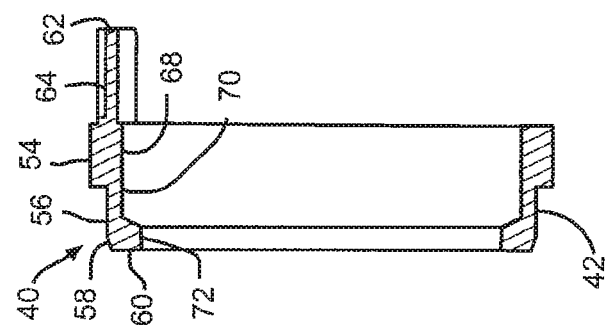
FIG. 8 depicts a cross-sectional view of the sealing ring taken along line 8-8.
Figure 7:
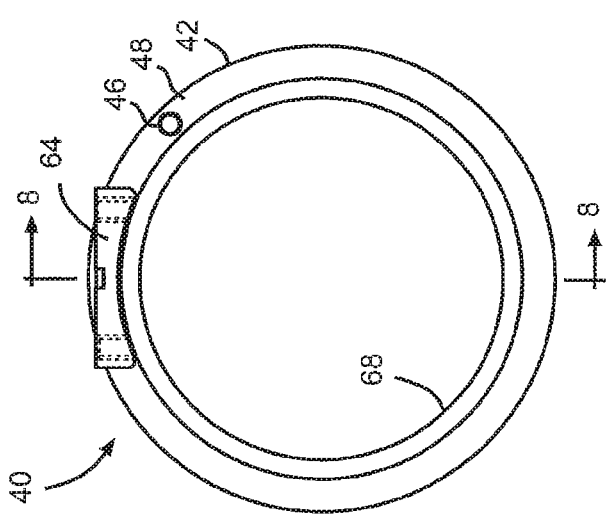
FIG. 7 depicts a plan view of the sealing ring of FIG. 6.
Figure 6:
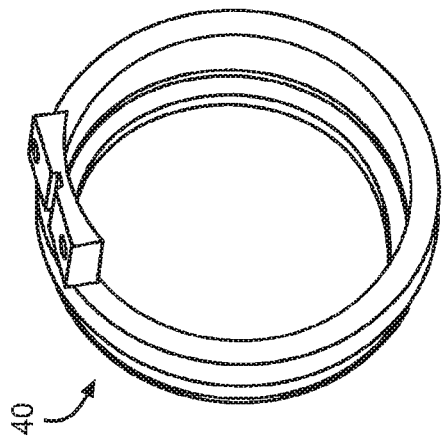
FIG. 6 depicts a perspective view of an embodiment of a sealing ring suitable for use in the various embodiments of the tire inflation system.
Figure 11:
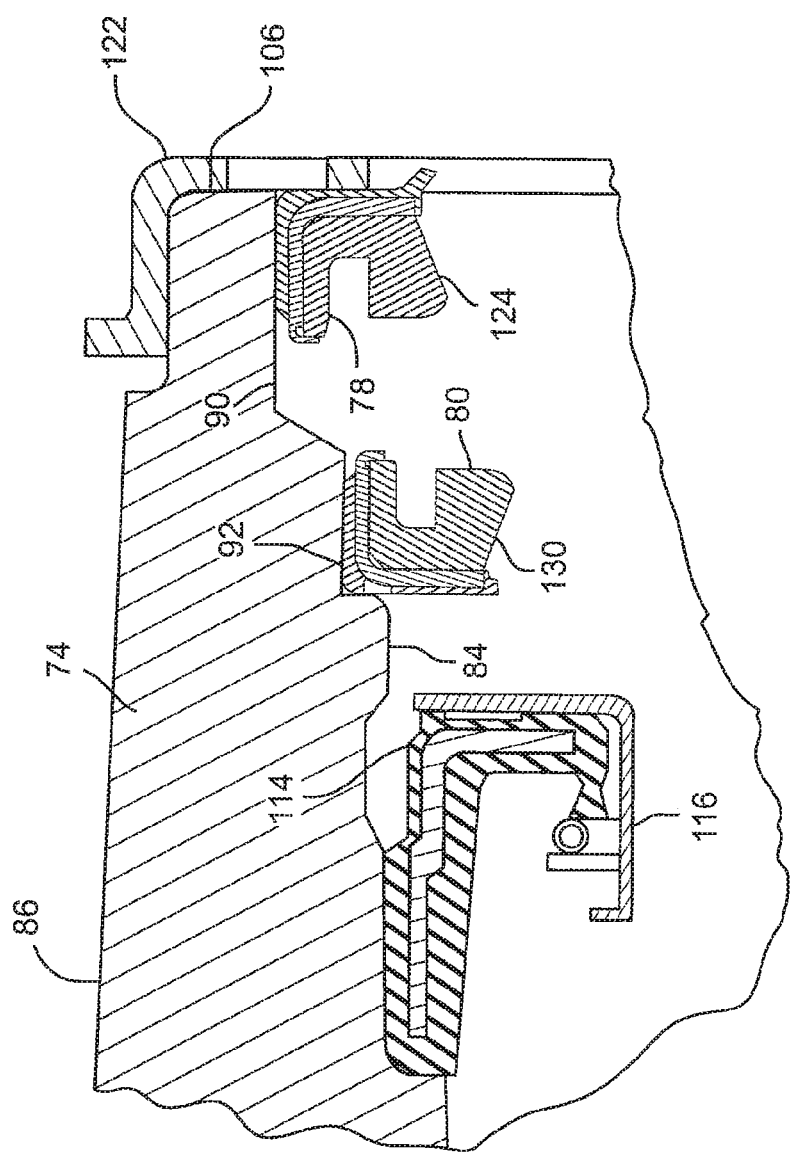
FIG. 11 depicts an enlarged view of a portion of the tire inflation system shown in FIG. 3 having portions of the system removed for the ease of illustration.

As illustrated in FIGS. 6-8, the sealing ring 40 is an annular member and is preferably metallic. The sealing ring 40 has an outer surface 42 and a conduit 44 formed therethrough. An inlet 46 of the conduit 44 is formed on an inboard edge 48 of the sealing ring 40. Preferably, the inlet is in fluid communication with a pump conduit 50 which is in communication with a fluid pump (not depicted). As illustrated in FIG. 3, the pump conduit 50 may extend around a portion of the outer surface 28 of the axle housing 24. Referring to FIG. 5, an outlet 52 of the conduit 44 is formed on the outer surface 42 of the sealing ring 40.

Referring back to FIGS. 7 and 8, the outer surface 42 of the sealing ring 40 is of a general cylindrical shape. The outer surface 42 may comprise a first diameter portion 54 and a second diameter portion 56. The first diameter portion 54 has a diameter which is of a length that is greater than that of the second diameter portion 56. The outer surface 42 may also comprise a chamfered portion 58 attached to an outboard end 60 of the sealing ring 40. On an opposite end 62, a plate 64 is attached to the inboard edge 48 of the sealing ring 40. The plate 64 is utilized to hold an anti-lock brake sensor 66.

The sealing ring 40 also comprises an inner surface 68. The inner surface 68 comprises a first diameter portion 70 and a second diameter portion 72. The first diameter portion 70 has a diameter which is of a length that is greater than that of the second diameter portion 72.

The hub assembly 36 comprises a hub 74. The hub 74 is rotatably disposed on the axle housing 24. Referring back to FIG. 3, the hub 74 is preferably rotatably disposed on the axle housing 24 using bearings 76 disposed between the hub 74 and the axle housing 24. Preferably, the bearings 76 are disposed about and engaged on the axle housing 24 before an inner rotary seal 78 and an outer rotary seal 80 are advanced during the manufacture of the system 20. Operating in this manner prevents misalignment of the seals 78, 80 on the sealing ring 40 during assembly.

The hub assembly 18 may be configured to hold a wheel assembly (not depicted) which is coupled to the hub 74 using a plurality of wheel studs 82. The hub 74 is also attached to the axle 26 as mentioned hereinabove and drivingly engaged therewith. The hub 74 is an annular member having an inner surface 84, an outer surface 86, and a conduit 88 formed therethrough.

As shown in FIG. 3, at least a portion of the inner surface 84 of the hub 74 has a stepped cylindrical shape. In this embodiment and as shown best in FIG. 5, the inner surface 84 comprises one or more recesses 90, 92. The outer surface 86 defines a hub flange 94. The hub flange 94 engages the wheel assembly and brake drum and is an annular protuberance having a plurality of perforations formed therethrough into which wheel studs 98 are disposed.

The conduit 88 is formed through the hub 26. The hub conduit 88 includes an inlet 104 formed adjacent an inboard end 106 of the hub 74. The inlet 104 of the hub conduit 88 is formed adjacent the inner rotary seal 78 and the outer rotary seal 80. Preferably, the inlet 104 is formed in the inner surface 84 of the hub 74 between the inner rotary seal 78 and the outer rotary seal 80. An outlet 108 of the hub conduit 88 is formed adjacent the outboard end 110 of the hub 74. As shown, a portion of the hub conduit 88 adjacent the outlet 108 has an increased diameter with respect to a remaining portion of the hub conduit 88 and, preferably, has threads formed therein for receiving a fastener 112, 112A such as, for example, an axle bolt 112 or an axle stud 112A.

A bearing seal 114 is disposed between the hub 74 and the axle housing 24. The bearing seal 114 may be formed from a rubber material and may include at least one reinforcing member provided therein. The bearing seal 114 militates against lubricant used with the bearings 76 from contacting the sealing ring 40, inner rotary seal 78, and outer rotary seal 80.

Preferably, the bearing seal 114 is disposed at a location inboard from the bearings 76 and outboard of the outer rotary seal 80. The bearing seal 114 is disposed on one of the axle housing 24 and the hub 74 and is in sealing contact with the remaining one of the axle housing 24 and the hub 74. In an embodiment, the bearing seal 114 is attached to the inner surface 84 of the hub 74. In this embodiment, the bearing seal 114 rotates with the hub 74 and a sealing edge 116 of the bearing seal 114 is in sealing contact with the outer surface 28 of the axle housing 24.

Preferably, the inner rotary seal 78 is disposed between the sealing ring 40 and the hub 74. As illustrated in FIG. 10, the inner rotary seal 78 may be formed from a rubber material and includes at least one reinforcing member 118 provided therein. The inner rotary seal 78 militates against a pressurized fluid, such as air, used in the tire inflation system 20 from exiting an area 120 between the inner rotary seal 78 and the outer rotary seal 80.

Referring back to FIG. 3, the inner rotary seal 78 is disposed at a location inboard from the outer rotary seal 80 and outboard from a tone ring 122. The inner rotary seal 78 is disposed on one of the sealing ring 40 and the hub 74 and is in sealing contact with the remaining one of the sealing ring 40 and the hub 74. In an embodiment, the inner rotary seal 78 is attached to the inner surface 84 of the hub 74. In this embodiment, the inner rotary seal 78 rotates with the hub 74 and a sealing edge 124 of the inner rotary seal 78 is in sealing contact with the outer surface 42 of the sealing ring 40. As best shown in FIG. 10, the inner rotary seal 78 also comprises a lip portion 126. The lip portion 126 contacts the outer surface 42 of the sealing ring 40 to militate against dirt and/or other debris from getting past.

Referring back to FIG. 3, preferably, the outer rotary seal 80 is disposed between the hub 74 and the sealing ring 40. As illustrated in FIG. 9, the outer rotary seal 80 may be formed from a rubber material and includes at least one reinforcing member 128 provided therein. The outer rotary seal 80 militates against a pressurized fluid, such as air, used in the tire inflation system 20 from entering the area between the hub 74 and the axle housing 24 and exiting the area between the inner rotary seal 78 and the outer rotary seal 80.

As illustrated in FIG. 3, the outer rotary seal 80 is disposed at a location inboard from the bearing seal 114 and outboard from the inner rotary seal 78. The outer rotary seal 80 is disposed on one of the sealing ring 40 and the hub 74 and is in sealing contact with the remaining one of the sealing ring 40 and the hub 74. In an embodiment, the outer rotary seal 80 is attached to the inner surface 84 of the hub 74. In this embodiment, the outer rotary seal 80 rotates with the hub 74 and a sealing edge 130 of the outer rotary seal 80 is in sealing contact with the outer surface 42 of the sealing ring 40.

Preferably, the inner rotary seal 78 and the outer rotary seal 80 are spaced apart from one another and disposed about the outer surface 42 of the sealing ring 40. The hub conduit 88 is in fluid communication with the conduit 44 formed through the sealing ring 40 through the area 120 between the inner rotary seal 78 and the outer rotary seal 80. In an embodiment, the inner rotary seal 78 is disposed about the first diameter portion 54 and the outer rotary seal 80 is disposed about the second diameter portion 56 of the sealing ring 40. As the first diameter portion 54 is of a diameter which is greater than that of the second diameter portion 56, the inner rotary seal 78 is preferably of a diameter which is of a length that is greater than that of a diameter of the outer rotary seal 80. For example, in this embodiment, an inner diameter of the inner rotary seal 78 is greater than an inner diameter of the outer rotary seal 80. Additionally, the inner rotary seal 78 and the outer rotary seal 80 may be disposed in separate recesses 90, 92 formed in the inner surface 84 of the hub 74.

A space 132 is provided between the bearing seal 114 and the outer rotary seal 80. As shown in FIG. 5, a vent 134 may be provided in the hub 74 which is in fluid communication with space 132. The vent 134 is provided to allow air which passes by the outer rotary seal 80 and lubricant which passes by the bearing seal 114 to be removed from the space 132. Removing air and lubricant from the space 132 helps to prevent lubricant from entering the hub conduit 88 and sealing ring conduit 44 and air from entering the axle housing 24.

The vent 134 is circumferentially spaced apart from the hub conduit 88 and positioned axially between the bearing seal 114 and the outer rotary seal 80. The vent 134 may comprise one or more conduits 136. Preferably, the vent 63 comprises at least three conduits 136. The one or more vent conduits 136 are formed in the hub 74 and extend from the inner surface 84 to the outer surface 86 thereof. Each conduit 136 is in fluid communication with the space 132 on an end 138 and with the atmosphere on an opposite end 140.

As shown, in an embodiment, the one or more vent conduits 136 may be oriented in a perpendicular relationship with the axle housing 24. However, in other embodiments (not depicted), the one or more vent conduits 136 are not limited to being oriented in a perpendicular relationship with the axle housing 24. For example, in an embodiment (not depicted), the one or more vent conduits 136 are oriented in an oblique relationship with the axle housing 24.

Referring now to FIGS. 3 and 4, the fastener 112, 112A is engaged with the hub 74 and is hollow having a conduit 142, 142A formed there through. The fastener conduit 142, 142A is in fluid communication with the conduit 88 formed in the hub 74. The fastener 112, 112A is disposed through the flanged end 32 of the axle 26 such it is sealingly engaged with the outlet 108 of the hub conduit 88. The fastener conduit 142, 142A facilitates fluid communication between the hub conduit 88 and a hose assembly (not shown).

In an embodiment which is shown in FIG. 3, the fastener is an axle bolt 112. In this embodiment, a head portion 144 of the axle bolt 112 abuts the flanged end 32 of the axle 26. The head portion 144 may have a hexagonal cross-sectional shape. The axle bolt 112 has the conduit 142 formed therethrough and an outer surface 146 which has a thread 148 formed thereon. The thread 148 formed in the outer surface 146 of the axle bolt 112 engages the thread formed in the portion of the hub conduit 88 adjacent the outboard end 110 of the hub 74. A recess 150 having a thread formed thereon is formed in the head portion 144 of the axle bolt 112.

In another embodiment which is shown in FIG. 4, the fastener is an axle stud 112A. A head portion 144A of the axle stud 112A abuts the flanged end 32 of the axle 26. The head portion 144A may have a cylindrical cross-sectional shape. The axle stud 112A has the conduit 142A formed there through and an outer surface 146A having a thread 148A formed thereon. The thread 148A formed in the outer surface 146A of the axle stud 112A engages the thread formed in the portion of the hub conduit 88 adjacent the outboard end 110 of the hub 74.

Figure 12:
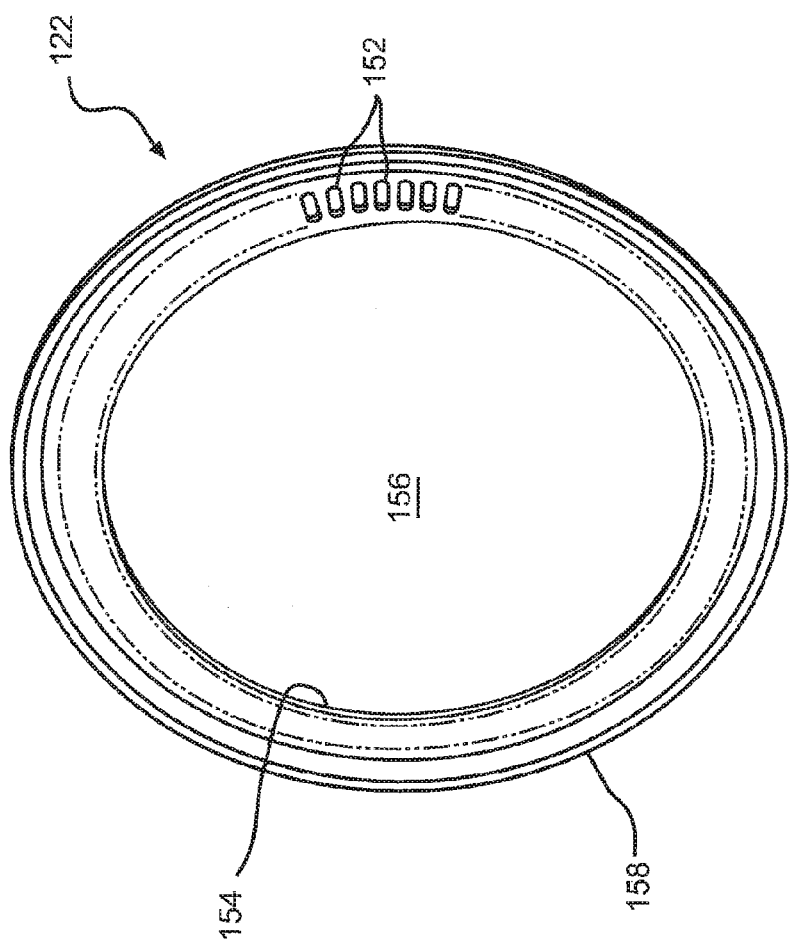
FIG. 12 depicts a perspective view of an embodiment of a tone ring suitable for use in the various embodiments of the tire inflation system.

In certain embodiments, the tire inflation system 20 comprises the tone ring 122. Tone rings are well known in anti-lock braking systems. Utilizing the anti-lock braking sensor 66 provided inboard of the tone ring 122, a vehicle speed and/or a rotational rate can be determined. An exemplary tone ring 122 suitable for use in the tire inflation system 20 is illustrated in FIG. 12. As illustrated, the tone ring 122 may comprise a plurality of apertures 152 and be generally ring-shaped. In this embodiment, the tone ring 122 comprises an inner diameter 154 which defines a major aperture 156 and an outer diameter 158.

As shown in FIGS. 3, 4, and 5, the tone ring 122 is attached to the outer surface 86 of the hub 74 at the inboard end 106 thereof. Preferably, the tone ring 122 is press-fit onto the hub 74 and is provided inboard of the inner rotary seal 78 and the outer rotary seal 80. In an embodiment, the tone ring 122 abuts the inner rotary seal 78. In this embodiment, the tone ring 122 prevents the inner rotary seal 78 from moving axially inboard of the first diameter portion 54 of the outer surface 42 of the seal ring 40.

The hose assembly comprises a fitting (not depicted), a hose (not depicted), and a valve fitting (not depicted). The valve fitting is sealingly engaged with the fastener 112, 112A. The valve fitting is in fluid communication with the fastener 112, 112A via a conduit (not depicted) formed through the hose and the fitting. The valve fitting is sealingly engaged with a tire valve (not depicted).

In use, the tire inflation system 20 facilitates fluid communication between the sealing ring conduit 44 and the hose assembly. When a fluid is pumped into or a pressure is applied to the sealing ring conduit 44, the fluid travels through or the pressure is applied to the area 120 between the inner rotary seal 78 and the outer rotary seal 80, the hub conduit 88, the fastener conduit 142, 142A and the hose assembly.

The pump (not depicted) is capable of pumping the fluid into or applying a pressure to the hub conduit 88 and is activated by a controller (not depicted) in response to a pressure within a tire (not depicted) as determined by a pressure sensor (not depicted) in communication with the controller. Alternately, the pump may be activated manually by an operator of the vehicle that the tire inflation system 20 is incorporated in, at periodic intervals to ensure each of the tires is maintained at a desired pressure, in response to changes in ambient temperature, or in response to changes in terrain.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A tire inflation system, comprising:
   an axle housing;
   a sealing ring disposed on the axle housing, the sealing ring having a conduit formed therethrough;
   a hub rotatably disposed on the axle housing, the hub disposed adjacent the sealing ring and having a conduit formed therethrough which is in fluid communication with a conduit formed through a fastener engaged with the hub;
   an inner rotary seal disposed between the sealing ring and the hub;
   an outer rotary seal disposed between the sealing ring and the hub, wherein the conduit formed through the hub is in fluid communication with the conduit formed through the sealing ring through an area between the inner rotary seal and the outer rotary seal; and
   a bearing seal disposed between the hub and the axle housing and outboard of the outer rotary seal.

2. The tire inflation system of claim 1, wherein the bearing seal is disposed on one of the axle housing and the hub and is in sealing contact with the remaining one of the axle housing and the hub.

3. The tire inflation system of claim 1, wherein the sealing ring is non-rotatably disposed on the axle housing.

4. The tire inflation system of claim 1, wherein the inner rotary seal and the outer rotary seal are spaced apart and disposed in separate recesses formed in an inner surface of the hub.

5. The tire inflation system of claim 1, wherein a space is provided between the bearing seal and the outer rotary seal.

6. The tire inflation system of claim 1, further comprising a vent formed in the hub, wherein the vent is in fluid communication with a space provided between the bearing seal and the outer rotary seal.

7. The tire inflation system of claim 1, further comprising a vent formed in the hub, wherein the vent comprises one or more conduits which extend from the inner surface to the outer surface of the hub.

8. The tire inflation system of claim 1, further comprising a tone ring which abuts the inner rotary seal.

9. The tire inflation system of claim 1, wherein the inner rotary seal is of a diameter which is greater than a diameter of the outer rotary seal.

10. The tire inflation system of claim 1, wherein the bearing seal is disposed inboard of bearings.

11. The tire inflation system of claim 1, wherein the fastener is an axle bolt or an axle stud.

12. The tire inflation system of claim 1, wherein the inner rotary seal and outer rotary seal are each disposed on the sealing ring and in separate recesses formed in the hub.

13. The tire inflation system of claim 1, wherein the sealing ring comprises an outer surface which has a first diameter portion, a second diameter portion and a chamfered portion wherein the inner rotary seal is provided about the first diameter portion, the outer rotary seal is provided about the second diameter portion and the chamfered portion is attached to an end of the sealing ring.

14. The tire inflation system of claim 6, wherein the vent is circumferentially spaced apart from the conduit formed through the hub.

15. The tire inflation system of claim 7, wherein the one or more vent conduits are oriented in a perpendicular relationship with the axle housing.

16. The tire inflation system of claim 7, wherein the vent comprises three conduits.

17. The tire inflation system of claim 8, wherein the tone ring is attached to an inboard end of the hub.

18. The tire inflation system of claim 9, wherein the diameter of the inner rotary seal which is greater than that of the outer rotary seal is an inner diameter.

19. A tire inflation system, comprising:
    an axle housing;
    a sealing ring disposed on the axle housing, the sealing ring having a conduit formed therethrough;
    a hub rotatably disposed on the axle housing, the hub disposed adjacent the sealing ring and having a conduit formed therethrough which is in fluid communication with a conduit formed through a fastener engaged with the hub;
    an inner rotary seal disposed between the sealing ring and the hub;
    an outer rotary seal disposed between the sealing ring and the hub, wherein the conduit formed through the hub is in fluid communication with the conduit formed through the sealing ring through an area between the inner rotary seal and the outer rotary seal;
    a bearing seal disposed between the hub and the axle housing and outboard of the outer rotary seal; and
    a vent formed in the hub, wherein the vent is in fluid communication with a space provided between the bearing seal and the outer rotary seal.

20. The tire inflation system of claim 19, wherein the vent comprises one or more conduits which are each circumferentially spaced apart from the conduit formed through the hub and oriented in a perpendicular relationship with the axle housing.

* * * * *